Nov. 29, 1938.   W. S. WOLFRAM   2,138,129
CLUTCH
Filed Sept. 13, 1937   2 Sheets-Sheet 1

Inventor
William S. Wolfram
By
Blackmore, Spencer & Flint
Attorneys

Nov. 29, 1938.  W. S. WOLFRAM  2,138,129
CLUTCH
Filed Sept. 13, 1937   2 Sheets-Sheet 2

Inventor
William S. Wolfram
By
Blackmore, Spencer & Flint
Attorneys

Patented Nov. 29, 1938

2,138,129

UNITED STATES PATENT OFFICE 2,138,129

CLUTCH

William S. Wolfram, Dayton, Ohio, assignor to General Motors Corporation, Detroit, Mich., a corporation of Delaware Application September 13, 1937, Serial No. 163,555

8 Claims. (Cl. 192—32)

This invention relates to a friction clutch such as is used to releasably couple the engine shaft to the transmission shaft of a motor vehicle.

An object of the invention is to so modify the conventional clutch as to lessen the manual effort to effect clutch release.

A related object and one whereby the above object is accomplished is to so modify the conventional construction as to make possible a less powerful and therefore less expensive clutch engaging spring.

As a more specific object related to the above major objects the invention provides self energizing mechanism, mechanism whereby the driving torque itself produces pressure additional to that produced by the clutch engaging spring for the purpose of gripping the driven part for rotation with the driving parts.

Other objects and advantages will be understood from the following description.

Figure 1:
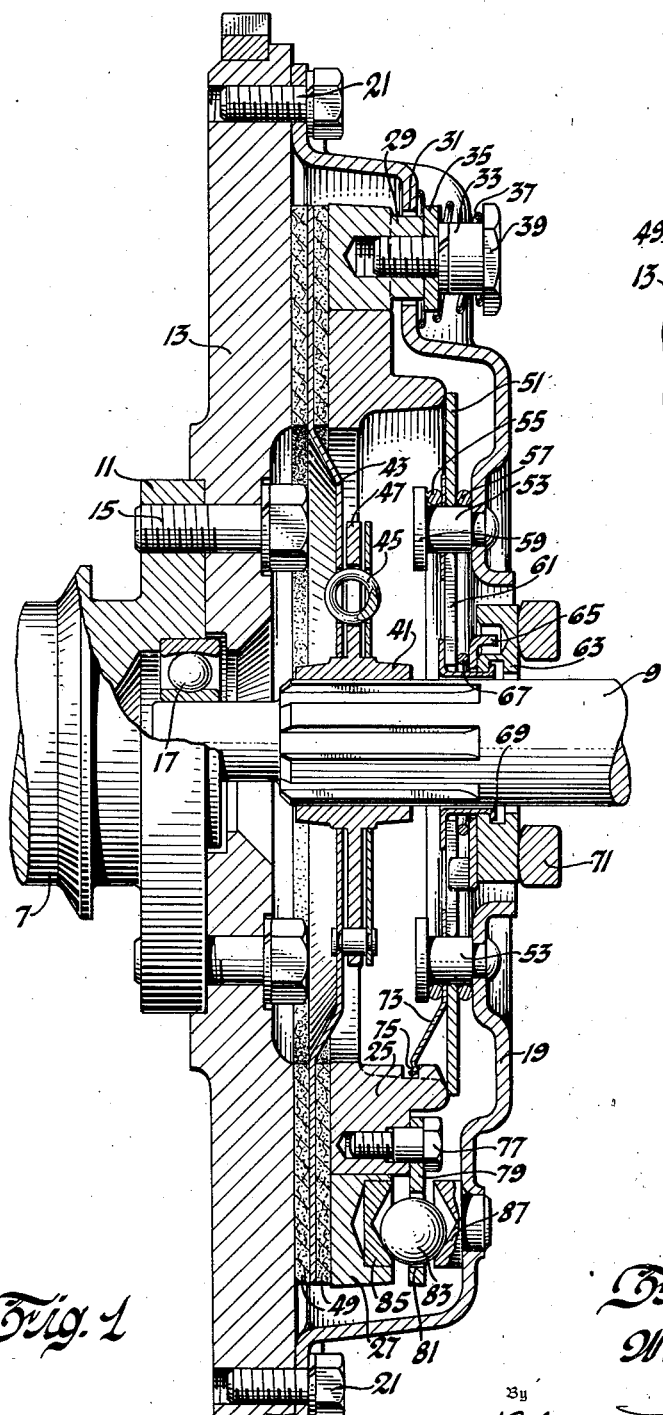
Figure 1 is a transverse section through the novel clutch.

Referring by reference characters to the drawings the engine shaft will be seen at 7 and numeral 9 is used to designate the driven or transmission shaft. To the flange 11 on the end of the engine shaft is secured a flywheel 13 by fastening means 15. The driven shaft is supported at its end adjacent the flywheel as shown on the drawings, by pilot bearing 17. The flywheel is provided with a more or less conventional stamped cover 19 secured as shown at 21. The pressure plate takes the form of an inner ring 25 and a concentric outer ring 27. The outer ring is formed with axial lugs 29 extending through openings 21 in the cover. Into these lugs are threaded cap screws 33, the cap screws extending through washers 35 engaging the ends of the lugs 29 and surrounding the openings 31. Springs 37 surround the cap screws and are located between the heads 39 and the outer face of the cover.

Splined on the driven shaft 9 is a hub 41 carrying the driven disc 43. A suitable spring cushion 45 is used between the flange 47 of the hub 41 and the driven disc 43. The driven disc is provided with facings 49 for frictionally engaging the face of the flywheel and the rings constituting the pressure plate.

The main clutch engaging spring is shown at 51. It takes the form of a bowed spring plate contacting at its outer periphery with the inner ring element 25 of the pressure plate. Shouldered rivets 53 in a circular series are carrier by the cover 19 and the spring 51 has apertures through which the rivets pass. There are fulcrum rings 55 and 57 supported by the several rivets and engaging the opposite faces of the spring plate 51, one ring 55 being in abutment with the rivet head 59 and the other being in contact with the cover 19. Inwardly of the rivets 53 the spring plate is formed with slots 61. The inner annular margin of the spring ring 51 is suitably secured to a collar 63 by an angular member 65, a ring 67 and a retainer 59, these parts constituting no part of this invention. At 71 are shown the arms of a throwout fork adapted to be rocked to move the collar 63 to the left. In so doing, the collar takes the load of spring 51 from the fulcrum ring 57 and as it continues to move toward the left, the spring fulcrums on fulcrum ring 55 and its pressure on the pressure plate element 25 is relieved. To insure the removal of the pressure plate ring 25 from contact with the driven plate 43, one or more flat yielding elements 73 may be used. One end of the releasing element 73 is carried on one of the rivets 53 and the other end is located in a notch 75 of ring 25.

Figure 2:
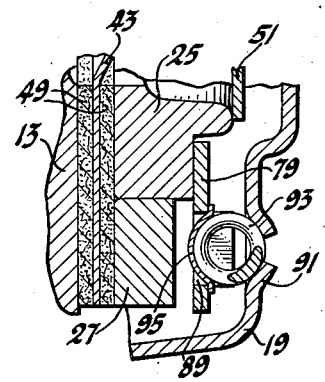
Figure 2 is a section on line 2—2 of Figure 4.
Figure 3:
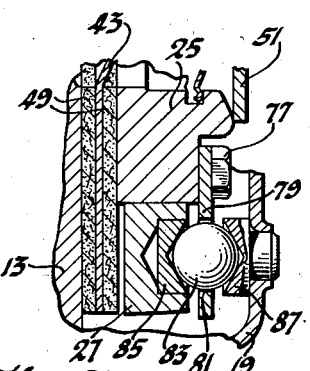
Figure 3 is a transverse section corresponding to the lower part of Figure 1 but with parts displaced from the positions shown in Figure 1.
Figure 4:
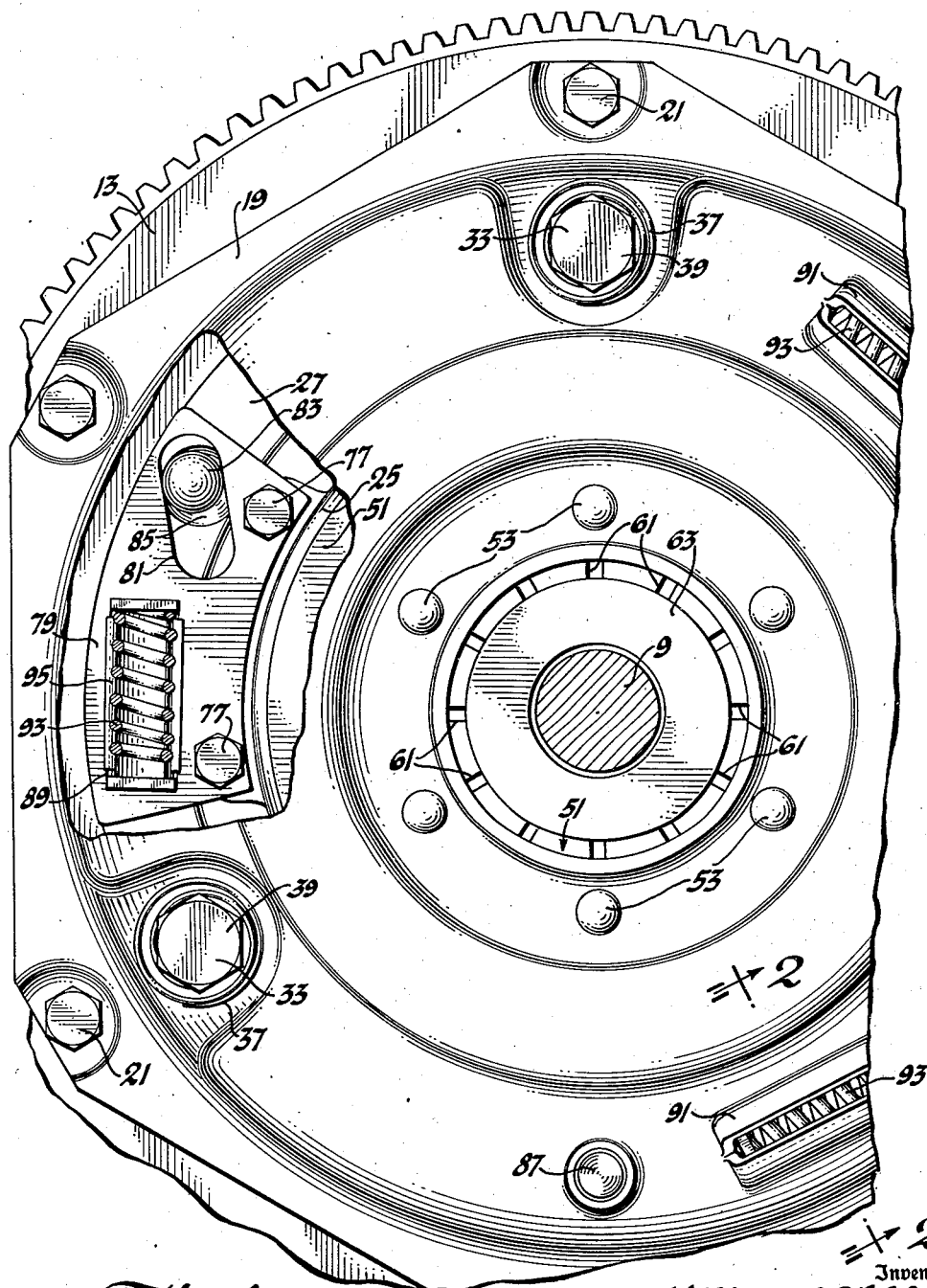
Figure 4 is a view in elevation with parts broken away and in section.

Secured to the inner pressure plate ring 25 by cap screws 77 are segments 79. In each segment is an angularly positioned slot 81, the center line of the slot being at an angle to the tangent of a circle, the center of which is common with the center of the clutch. Within this slot is a ball 83. The ball is received between conically recessed buttons 85 and 87 carried by the outer ring 27 and the cover 19 respectively. Also each segmental plate 79 is provided with a slot 89. Cooperating with slot 89 is a slot and recess construction formed in the cover as shown in Figure 2 and marked with numeral 91. These parts position a coil spring 93 held in place by a yielding retainer 95 supported by plates 79 along the wall of the slot 89, in cooperation with the tongues bent from the cover plate as shown in Figure 2. Since spring 93 engages end walls of retainer 95 and also the end walls of the recess formed in the cover, the segmental plate is biased to a predetermined relative position, a position wherein the ball is in the deep parts of the recesses of the buttons. This is the relative position of the cover and segments when the clutch is released. Under these circumstances the spring 33 is operative to withdraw the outer ring 27 from contact with the driven plate and to an extent such that its clutch engaging face is axially removed from the corresponding face of element 25.

When the clutch is to be engaged to accelerate the car speed, spring 51 is permitted to push the pressure plate element 25 into contact relation with the driven plate. Since ring 25 is mounted in such a way as to have a circumferential rotation relative to outer ring 27, the drag of the driven disc on the more rapidly rotating disc 25 causes just such relative rotation. Thereupon the segmental plate carried by the ring 25 causes the ball element to move radially outward owing to the angular characteristic of the slot. This pushes the outer ring into contact with the driven plate, incidentally thereby tensioning springs 93 and 33. The whole pressure plate means thereby becomes effective in driving the driven plate as a result of an initial action of the rather light spring 51 and the effect of clutch torque operating through the instrumentality of the slotted segmental plate structure upon the outer ring. In the event of clutch engagement when the driven plate is rotating faster than the driving members, as in cases where the car speed exceeds the engine speed, the ring 25 moves ahead of ring 27 when the former engages the driven plate. The balls 83 function as before but move radially in an opposite direction. Thereafter when the clutch is to be released the operator by means of the conventional clutch pedal releases the inner ring from the action of spring 51 whereupon the wedging balls 83 are restored to their neutral position between the deep parts of the buttons, the restoration being effected by spring 93. The spring 33 then withdraws the outer ring to its outermost position in an obvious manner.

I claim:

1. In a clutch, driving and driven members, a pressure plate driven with the driving member and having two separate parts to engage the driven member, yielding means to move the first part of the pressure plate into contact with the driven member and means responsive to torque resulting from said contact operable to move the second part of the pressure plate into contact with the driven member.

2. The invention defined by claim 1, said parts being in the form of coaxial rings.

3. The invention defined by claim 1, said parts being in the form of coaxial rings, and mechanism whereby said rings may move relatively to each other both axially and circumferentially.

4. The invention defined by claim 1, together with a cover plate, said parts consisting of said coaxial rings, segmental plates carried by one of said rings, a cam slot in said segmental plate, recessed buttons carried by said second ring and said cover, a ball in said slot between said buttons whereby axial reciprocation of said second ring is produced by relative circumferential movement between said rings.

5. In a clutch, a flywheel, a cover secured thereto, a pressure plate within said cover, said pressure plate constituted by inner and outer coaxial rings, means to yieldingly press the inner ring toward the flywheel, yielding means to withdraw the outer ring away from the flywheel, a driven member adapted to be gripped between the flywheel and pressure plate, and mechanism responsive to the engaging action of the inner ring to cause the outer ring to move to clutch engaging position.

6. The invention defined by claim 5, said mechanism comprising a segmental plate secured to said inner ring, said plate having a cam slot, a ball in said slot, and opposed buttons with conical recesses seating said ball, said buttons being secured to said cover and to the outer ring.

7. The invention defined by claim 5, said mechanism comprising a segmental plate secured to said inner ring, said plate having a cam slot, a ball in said slot, and opposed buttons with conican recesses seating said ball, said buttons being secured to said cover and to the outer ring, together with a spring to bias said segmental plate to that position relative to the cover wherein the ball is in the deep parts of the recesses.

8. In a clutch, first and second frictionally engaging members, yielding means to effect clutch engagement of said members, mechanical means to effect disengagement, a third frictional member, and servo mechanism responsive to clutch torque resulting from the engagement of the first and second members to move said third member into frictional engagement with the first member.

WILLIAM S. WOLFRAM.